United States Patent
Inada et al.

(10) Patent No.: US 7,856,308 B2
(45) Date of Patent: Dec. 21, 2010

(54) KNOCK DETECTION APPARATUS FOR INTERNAL COMBUSTION ENGINE

(75) Inventors: Takahiko Inada, Tokyo (JP); Kimihiko Tanaya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 634 days.

(21) Appl. No.: 11/945,077

(22) Filed: Nov. 26, 2007

(65) Prior Publication Data

US 2008/0257018 A1  Oct. 23, 2008

(30) Foreign Application Priority Data

Apr. 19, 2007  (JP) .............................. 2007-110266

(51) Int. Cl.
G01L 23/22 (2006.01)
F02P 1/00 (2006.01)
G06F 19/00 (2006.01)

(52) U.S. Cl. .................. 701/111; 123/406.37; 73/35.08

(58) Field of Classification Search ................. 701/111; 123/406.29, 406.34, 406.37, 406.38; 73/35.08, 73/35.09, 35.01
See application file for complete search history.

(56) References Cited

U.S. PATENT DOCUMENTS 5,979,406 A * 11/1999 Aoki et al. ............. 123/406.37
6,000,276 A * 12/1999 Mogi et al. ................ 73/35.08
6,789,409 B2 * 9/2004 Tanaya ...................... 73/35.08

FOREIGN PATENT DOCUMENTS

| JP | 60213859 A | 10/1985 |
|---|---|---|
| JP | 3-19448 U | 2/1991 |
| JP | 442244 U | 4/1992 |
| JP | 3264854 B2 | 9/1998 |
| JP | 2000145605 A | 5/2000 |
| JP | 2001-234804 A | 8/2001 |
| JP | 2003-278593 A | 10/2003 |

OTHER PUBLICATIONS

Japanese Office Action dated Dec. 12, 2008.

* cited by examiner

*Primary Examiner*—Hieu T Vo
(74) *Attorney, Agent, or Firm*—Sughrue Mion, PLLC

(57) ABSTRACT

A knock detection apparatus for an internal combustion engine can accurately detect the occurrence of a knock without an influence of a noise component even if the noise component having the same frequency as a knock vibration superposes on an ionic current signal. The apparatus includes an ionic current detection section, a knock signal detection section for detecting a knock signal based on an ionic current, a crank angle sensor for detecting a crank angle corresponding to a rotational position of the engine, a window setting section for setting a noise detection window, a noise component detection section for detecting a noise component in the window, and a knock determination section for determining the occurrence of a knock based on a relation between the noise component and the knock signal. The window setting section sets the window after a predetermined crank angle corresponding to an end of a combustion stroke of the engine.

11 Claims, 8 Drawing Sheets

KNOCK DETECTION APPARATUS FOR INTERNAL COMBUSTION ENGINE

BACKGROUND OF THE INVENTION

1. Field of the Invention

The present invention relates to a knock control apparatus for an internal combustion engine which detects the presence or absence of the occurrence of knocking (hereinafter abbreviated as a "knock") based on the waveform of an ionic current generated upon combustion of the internal combustion engine.

2. Description of the Related Art

In general, ions are generated when fuel is burned or combusted in cylinders of an internal combustion engine, so an ionic current can be observed by a probe installed in each cylinder with a high voltage impressed thereto. Also, it is known that noise of a vibration component of the same vibration frequency as that of a knock is superposed on such an ionic current. Accordingly, in the past, there has been proposed an apparatus that detects the occurrence of a knock by extracting a vibration component superposed on an ionic current and performs knock control (retard correction of ignition timing) (see, for instance, a patent document: Japanese patent application laid-open No. H10-9108).

In the known knock detection apparatus for an internal combustion engine disclosed in the above-mentioned first patent document, a high voltage for observation of an ionic current is produced by using a secondary voltage generated in an ignition coil at the time of ignition thereof, and an ionic current is measured by impressing the high voltage thus produced to an end of a spark plug immediately after the termination of a discharge thereof. A knock signal in the form of a vibration component of a knock frequency band (knock signal) is extracted from the ionic current through a band-pass filter, and the knock signal thus extracted is amplified and waveform shaped by comparison with a detection threshold to produce a knock pulse.

Hereinafter, the knock pulse is sent to an engine control unit (ECU) where it is used for a determination as to whether a knock occurs, and the ECU performs ignition timing retard control upon the occurrence of a knock based on this determination result.

However, noise of the same vibration component as a knock frequency might sometimes be superposed on an ionic current, depending upon the operating state of the internal combustion engine, in spite of the non-occurrence of a knock.

In addition, it is known that some engines generate pressure pulsation in cylinders without regard to the occurrence of a knock, and a vibration component might superpose on an ionic current waveform upon generation of such pressure pulsation.

In the known knocking detection apparatuses for an internal combustion engine, there is the following problem. That is, a knock vibration component is extracted by using a band-pass filter, etc., so a noise component having the same frequency component as a knock frequency can not be distinguished from a knock.

In particular, in a knock detection apparatus based on an ionic current signal (detection signal for an ionic current), a noise component having a vibration amplitude intensity and a vibration duration comparable to a vibration signal generated upon the occurrence of a large knock is superposed on the ionic current signal, so there is a problem that it becomes very difficult to extract only a knock signal from the ionic current signal.

SUMMARY OF THE INVENTION

Accordingly, the present invention is intended to solve the problems as referred to above, and has for its object to obtain a knock detection apparatus for an internal combustion engine which can accurately detect the occurrence of a knock without receiving an influence of a noise component even if the noise component having the same frequency as a knock vibration superposes on an ionic current signal, by focusing on the fact that the attenuation speed of the ionic current signal is fast upon the occurrence of the knock in which fuel and combustion air are consumed by intense combustion thereof for a short time, and that at an end of a combustion stroke after a predetermined timing (crank angle), substantially no ionic current signal is generated and no noise component is generated either.

According to one aspect of the present invention, there is provided a knock detection apparatus for an internal combustion engine which includes: an ionic current detection device that detects an ionic current based on ions generated upon combustion in the internal combustion engine; a knock signal detection section that detects a knock signal based on the ionic current; a crank angle detection section that detects a crank angle corresponding to a rotational position of the internal combustion engine; a window setting section that sets a noise detection window after a predetermined crank angle corresponding to an end of a combustion stroke of the internal combustion engine; a noise component detection section that detects a noise component based on at least one of a frequency component intensity of the ionic current and an amount of ionic current generated in the window; and a knock determination section that determines the presence or absence of the occurrence of a knock based on a relation between the noise component and the knock signal.

According to another aspect of the present invention, there is provided a knock detection apparatus for an internal combustion engine which includes: an ionic current detection device that detects an ionic current based on ions generated upon combustion in the internal combustion engine; a knock signal detection section that detects a knock signal corresponding to a knock vibration of the internal combustion engine; a crank angle detection section that detects a crank angle corresponding to a rotational position of the internal combustion engine; a window setting section that sets a noise detection window after a predetermined crank angle corresponding to an end of a combustion stroke of the internal combustion engine; a noise component detection section that detects a noise component based on at least one of a frequency component intensity of the ionic current and an amount of ionic current generated in the window; and a knock determination section that determines the presence or absence of the occurrence of a knock based on a relation between the noise component and the knock signal.

According to the present invention, at an end of a combustion stroke upon the occurrence of a knock, an ionic current is not substantially generated, and a noise component is not generated either, based on which even if a noise component of the same frequency as a knock vibration superposes on the ionic current, it is possible to detect the presence or absence of the occurrence of a knock at a high degree of precision and at a high degree of efficiency by distinguishing the noise component and the knock signal from each other with high precision.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Hereinafter, preferred embodiments of the present invention will be described in detail while referring to the accompanying drawings.

Embodiment 1

Figure 1:
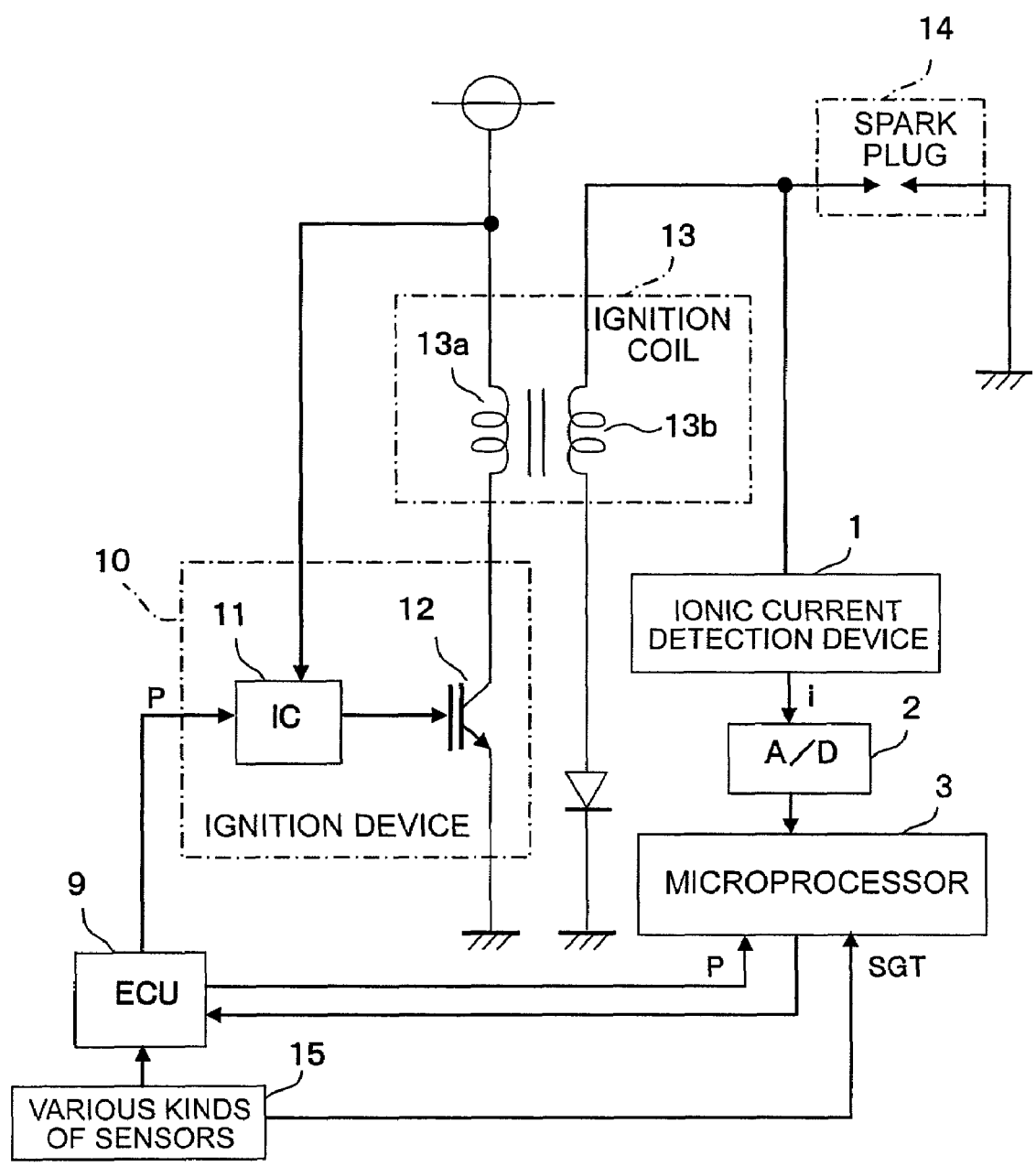
FIG. 1 is a block diagram schematically showing a knock detection apparatus for an internal combustion engine according to a first embodiment of the present invention.
Figure 2:
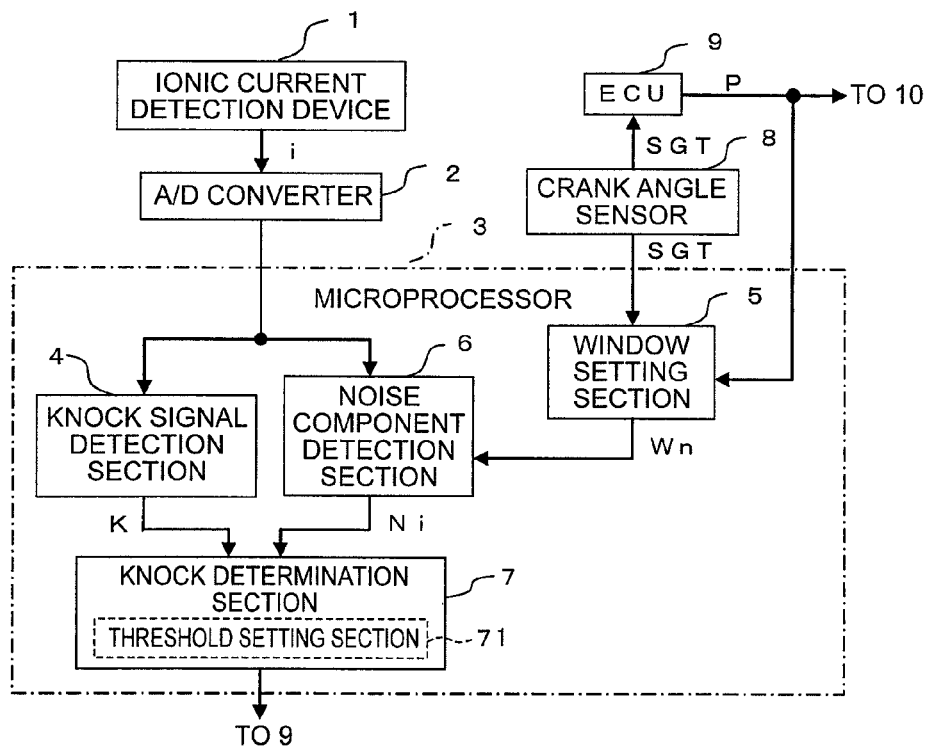
FIG. 2 is a functional block diagram illustrating a specific configuration of a microprocessor in FIG. 1.

Referring to the drawings and first to FIG. 1, there is schematically shown, in a block diagram, a knock detection apparatus for an internal combustion engine according to a first embodiment of the present invention, and FIG. 2 is a functional block diagram illustrating an example of a specific configuration of a microprocessor in FIG. 1.

In FIG. 1, the knock detection apparatus for an internal combustion engine includes an ionic current detection device 1 for detecting an ionic current upon combustion in the internal combustion engine, an A/D converter 2 for converting the ionic current i into a digital signal, a microprocessor 3 into which the ionic current i after A/D conversion is taken, an ECU 9 mutually associated with the microprocessor 3 for controlling the internal combustion engine, and a variety of kinds of sensors 15 including a crank angle sensor 8 (see FIG. 2).

Also, the internal combustion engine (not shown) to be controlled by the ECU 9 includes an ignition device 10 that is driven to operate in response to an ignition signal P, an ignition coil 13 that is driven to be energized and deenergized by means of the ignition device 10, and a spark plug 14 that generates a discharge spark between opposed electrodes under the action of a high voltage output from the ignition coil 13. The spark plug 14 is arranged in each combustion chamber of the internal combustion engine, and fires an air fuel mixture in the combustion chamber by the discharge spark.

The ignition device 10 is provided with an IC 11 that generates an ignition control signal in response to the ignition signal P, and a power transistor 12 that is turned on and off by the ignition control signal from the IC 11.

The ignition coil 13 is provided with a primary winding 13a that is energized and deenergized by the power transistor 12, and a secondary winding 13b that generates a high voltage upon the interruption or deenergization of the primary winding 13a and impresses it to the spark plug 14.

The secondary winding 13b of the ignition coil 13 and the spark plug 14 are associated with the ionic current detection device 1, so that the high voltage from the secondary winding 13b is supplied to the ionic current detection device 1 as a bias power supply for ionic current detection.

In addition, the ionic current detection device 1 detects the ions generated around the spark plug 14 (in the combustion chamber) as the ionic current i by impressing the voltage of the bias power supply to the opposed electrodes of the spark plug 14 after the combustion of the internal combustion engine.

The detection signal in the form of the ionic current i is converted from analog data into digital data by means of an A/D converter 2 and is input to the microprocessor 3.

The variety of kinds of sensors 15 inputs information on the operating state of the internal combustion engine (including a crank angle signal SGT) to the ECU 9 and the microprocessor 3.

The ECU 9 inputs the ignition signal P corresponding to the engine operating state to the ignition device 10 and the microprocessor 3. The microprocessor 3 inputs a knock determination result (to be described later) based on the ionic current i, the crank angle signal SGT, and the ignition signal P to the ECU 9.

In FIG. 2, the crank angle sensor 8 included in the variety of kinds of sensors 15 (see FIG. 1) detects a crank angle corresponding to the rotational position of the internal combustion engine, and inputs the corresponding crank angle signal SGT to the ECU 9 and the microprocessor 3.

The microprocessor 3 is provided with a knock signal detection section 4, a window setting section 5, a noise component detection section 6 and a knock determination section 7.

The knock signal detection section 4 detects a knock signal Ki based on the ionic current i after A/D conversion, and outputs the knock signal Ki as a knock threshold value (to be described later).

The window setting section 5 sets a window Wn for noise detection based on the crank angle signal SGT and the ignition signal P after a predetermined crank angle corresponding to the end of the combustion stroke of the internal combustion engine.

The noise component detection section 6 detects a noise component Ni based on at least one of the frequency component intensity of the ionic current i and the amount of ionic current generated in the window Wn, and outputs the noise component Ni as a noise component threshold value (to be described later).

The knock determination section 7 has a threshold setting section 71 and a correction section (to be described later), and determines the final presence or absence of the occurrence of a knock based on the relation between the noise component Ni and the knock signal Ki, and inputs the knock determination result to the ECU 9. The threshold setting section 71 sets a threshold for knock detection (to be described later) in the form of a comparison reference with respect to the noise component Ni.

Now, reference will be made to the operation of the microprocessor 3 according to the first embodiment of the present invention while referring to flow charts FIGS. 3 through 6 together with FIGS. 1 and 2.

FIGS. 3 through 6 show individual processing operations according to the knock signal detection section 4, the window setting section 5, the noise component detection section 6 and the knock determination section 7, respectively, in the microprocessor 3.

Figure 7:
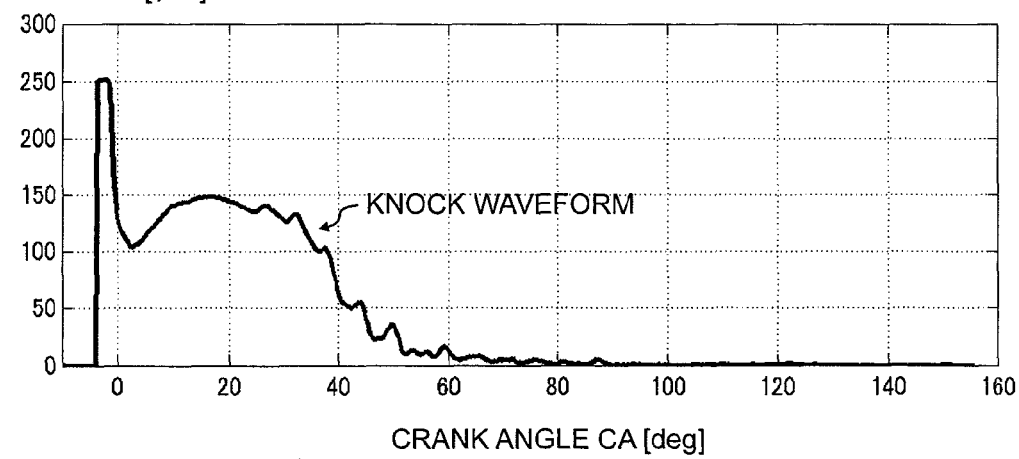
FIG. 7 is a waveform view showing an ionic current when a knock is superposed thereon according to the first embodiment of the present invention.
Figure 8:
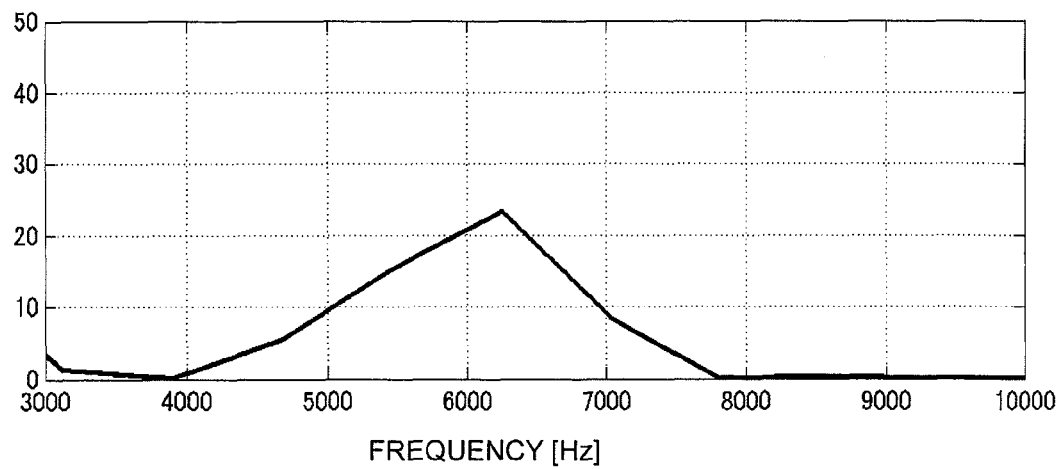
FIG. 8 is a waveform view showing an FFT power spectrum of an ionic current waveform of FIG. 7.
Figure 9:
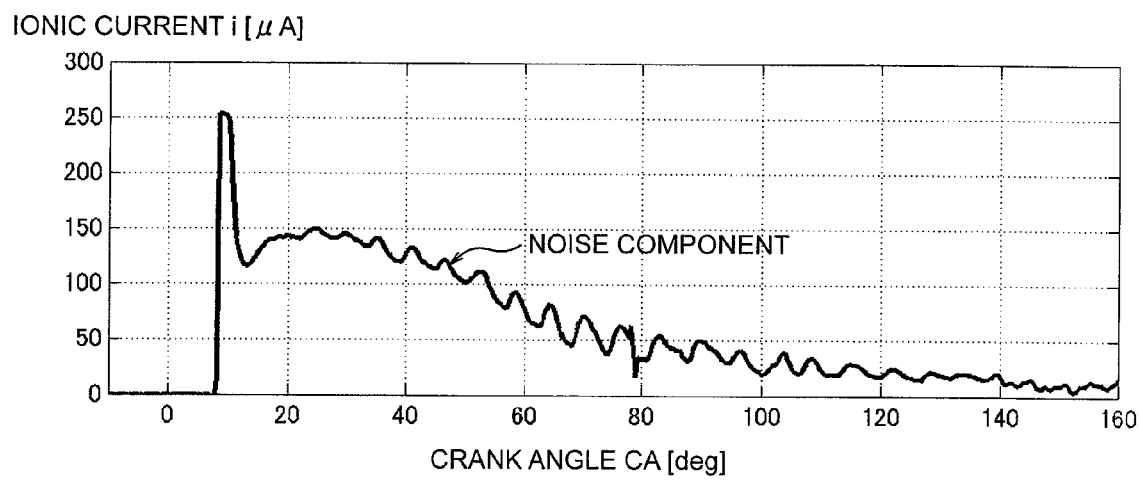
FIG. 9 is a waveform view showing an ionic current when noise is superposed thereon according to the first embodiment of the present invention.
Figure 10:
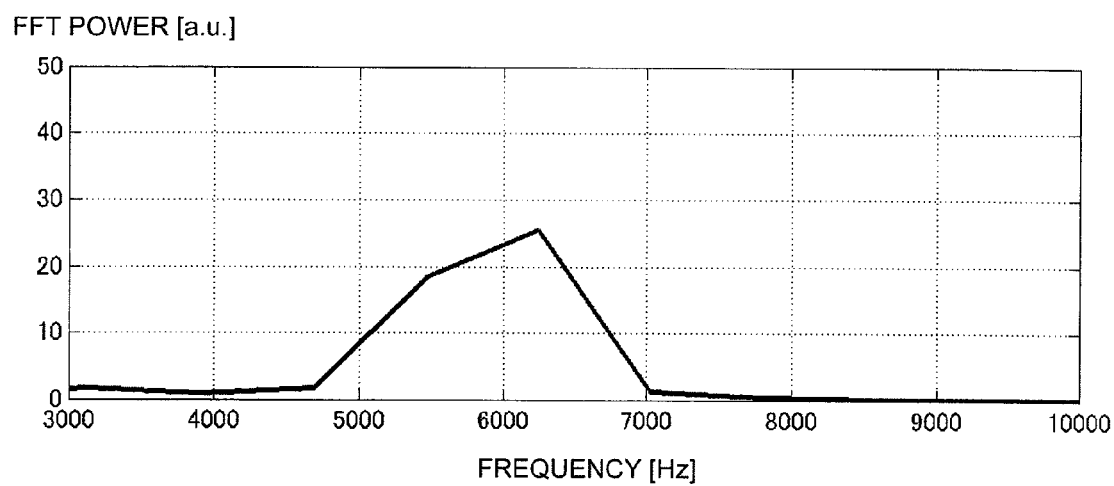
FIG. 10 is a waveform view showing an FFT power spectrum of an ionic current waveform of FIG. 9.
Figure 11:
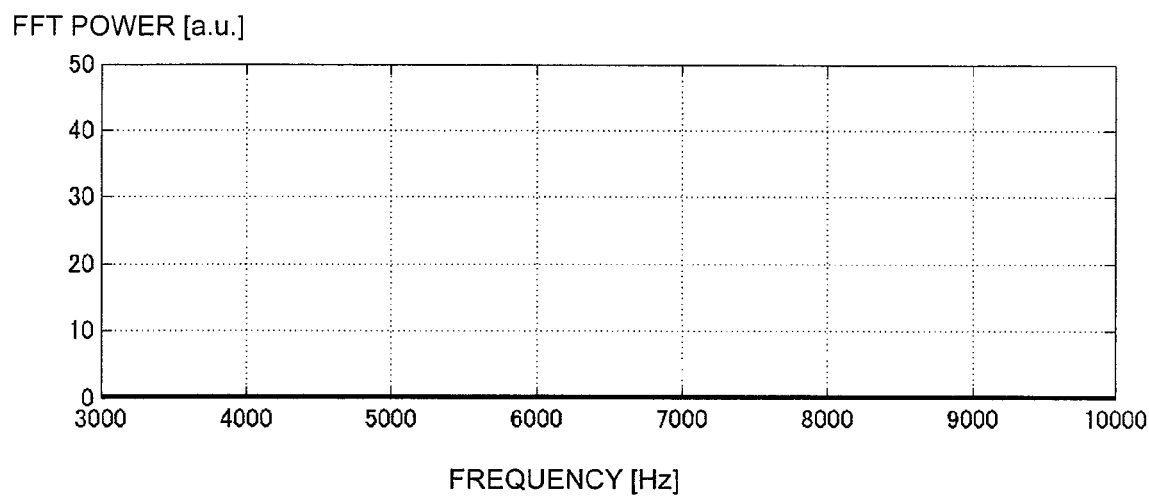
FIG. 11 is a waveform view showing an FFT power spectrum of an ionic current waveform of FIG. 7 in a range set after a crank angle of 90 CA according to the first embodiment of the present invention.
Figure 12:
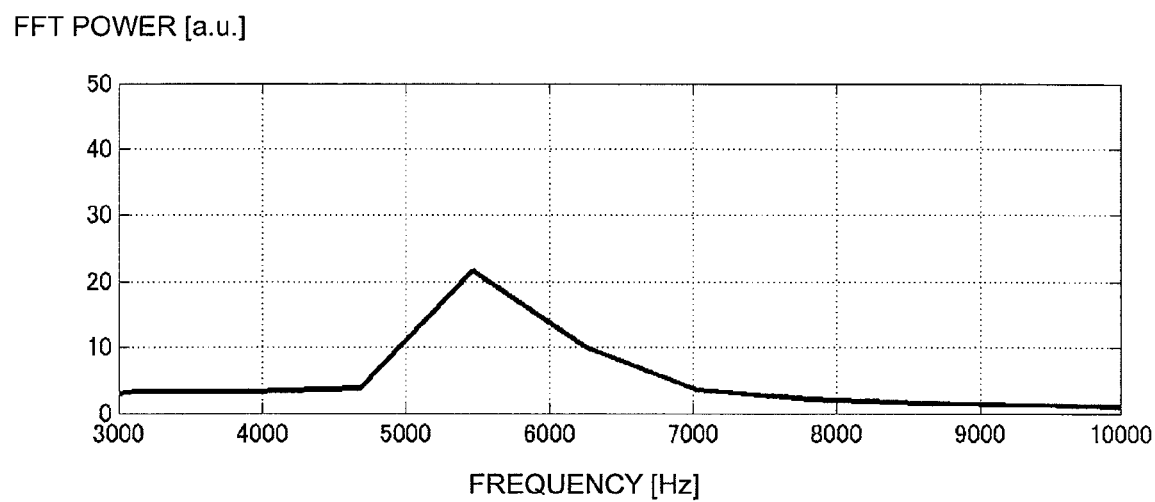
FIG. 12 is a waveform view showing an FFT power spectrum of an ionic current waveform of FIG. 9 in a range set after a crank angle of 90 CA according to the first embodiment of the present invention.

FIG. 7 shows an ionic current i with a knock waveform superposed thereon, wherein the axis of abscissa represents the crank angle CA [deg]. FIG. 8 shows the spectrum of FFT power [a.u.] of an ionic current waveform (with a knock superposed thereon) of FIG. 7, wherein the axis of abscissa represents the frequency [Hz]. FIG. 9 shows an ionic current i with a noise waveform superposed thereon, and FIG. 10 shows the spectrum of FFT power [a.u.] of an ionic current waveform (with noise superposed thereon) of FIG. 9. FIG. 11 shows the spectrum of FFT power [a.u.] of an ionic current waveform (with a knock superposed thereon) of FIG. 7 in a detection range TWn set after a crank angle of 90 CA. FIG. 12 shows the spectrum of FFT power [a.u.] of an ionic current waveform (with a noise superposed thereon) of FIG. 9 in a detection range TWn set after a crank angle of 90 CA.

First of all, the operation of the knock signal detection section 4 will be described while referring to FIG. 3 before describing the operations of the window setting section 5 and the noise component detection section 6. Here, it is assumed that the knock signal detection section 4 performs knock detection processing using FFT (Fourier transform) as one example.

Figure 3:
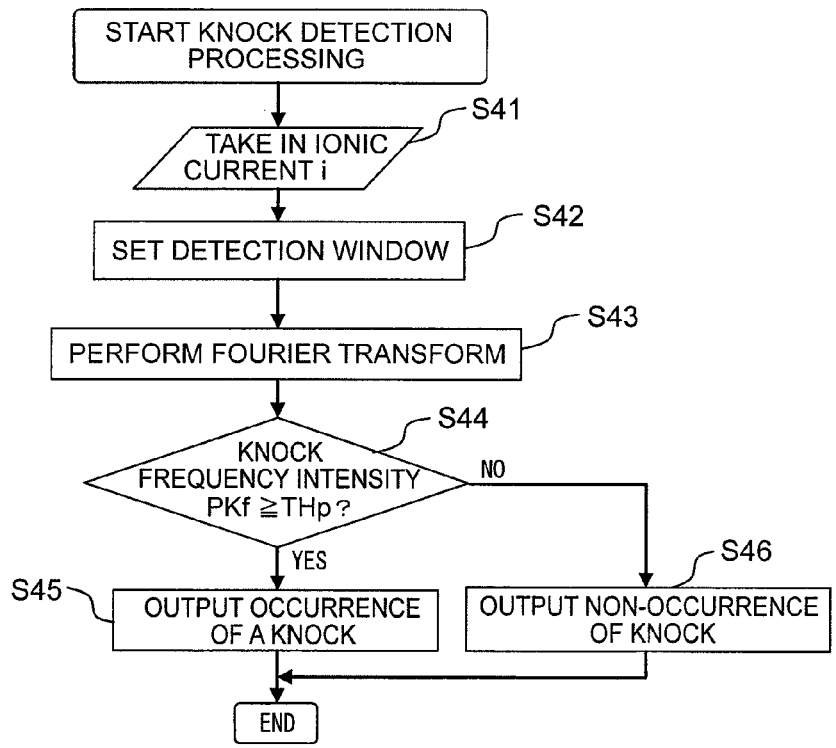
FIG. 3 is a flow chart illustrating knock detection operation processing according to the first embodiment of the present invention.

In FIG. 3, first of all, the knock signal detection section 4 takes in an ionic current i after A/D conversion (step S41), and sets a detection window (step S42).

As a result, only detected data of the ionic current i input to the knock signal detection section 4a is extracted in a necessary range based on the detection window, and the ionic current i is further multiplied by a window function for suppressing the influence of ends of the detected data.

Then, the knock signal detection section 4 converts the detected data of the ionic current i, to which preprocessing (detection window, window function, etc.) was applied, into an FFT power spectrum by Fourier transform (step S43).

Subsequently, by comparing a spectral intensity (knock frequency intensity) PKf, among the FFT power spectrum, corresponding to the natural vibration frequency of the knock with a predetermined threshold THp, it is determined whether the knock frequency intensity PKf is larger than or equal to the predetermined threshold THp (step S44).

When it is determined as PKf≧THp in step S44 (that is, YES), the knock signal detection section 4 outputs a knock signal Ki indicating that a knock has occurred (step S45), and terminates the processing of FIG. 3.

On the other hand, when it is determined as PKf<THp in step S44 (that is, NO), the knock signal detection section 4 outputs a knock signal Ki indicating that a knock has not occurred (the non-occurrence of a knock) (step S46), and terminates the processing of FIG. 3.

Here, the relation between a knock generated in the internal combustion engine and the ionic current i will be specifically described. A knock is assumed to be a phenomenon that fuel causes a self ignition explosion when the pressure or temperature of the interior of a combustion chamber rises abnormally. According to a general analysis, in an internal combustion engine, a knock occurs due to an abnormal temperature rise in the cylinder when a combustion flame reaches the top surface of a piston in a cylinder at the instant the piston is in the vicinity of the top dead center thereof.

In addition, a knock is liable to occur on the inner wall surface of a combustion chamber, and a shock wave generated upon the occurrence of the knock disperses mainly in the direction of a bore in the cylinder, so there occurs a standing wave of a pressure oscillation in the combustion chamber.

In conventional general knock detection apparatuses, the presence or absence of the occurrence of a knock is determined by directly detecting a knock vibration due to the standing wave generated in the combustion chamber, but in the knock detection apparatus using an ionic current i according to the present invention, a knock signal Ki is detected on the basis of FIGS. 7 and 8.

FIG. 7 shows one example of an ionic current waveform upon the occurrence of a knock, and FIG. 8 shows the frequency spectrum of the FFT power of a knock superposition waveform of FIG. 7.

In FIG. 7, upon occurrence of a knock vibration in a cylinder, there occurs a variation in the ionization probability due to a temperature change according to a pressure oscillation generated in the cylinder, so it is possible to detect an oscillating wave superposed on the ionic current i by the variation of the ionization probability on the basis of the FFT power spectrum of FIG. 8.

However, the pressure oscillation generated in the cylinder is not limited to the one that depends on a knock, but includes, for example, a noise component due to combustion disturbances.

FIG. 9 shows the waveform of an ionic current i with a noise component superposed thereon, and FIG. 10 shows the frequency spectrum of the FFT power of a noise superposition waveform of FIG. 9.

Since the pressure oscillation due to the noise component is a standing wave, the oscillation frequency of the noise component is identical with the FFT power spectrum (see FIG. 8) due to a knock, as shown in the FFT power spectrum of FIG. 10, and the amplitude of the noise component is also the same level.

Accordingly, the noise component detection section 6 in the microprocessor 3 clearly distinguishes the noise component from knock vibration by detecting the oscillation of the noise component superposed on the ionic current i.

In general, in the combustion upon the occurrence of a knock, intense combustion is caused in a short time to consume fuel and combustion air, so the attenuation speed of an ionic current signal generated is fast, and no noise component is generated after a predetermined timing at the end of a combustion stroke.

Accordingly, focusing on this point, the noise component detection section 6 distinguishes, based on a window Wn for noise detection, a vibration resulting from causes other than a knock and a vibration resulting from a knock from each other, and achieves improvements in the knock detection accuracy.

For example, when an ionic current i with a knock vibration superposed thereon is input, as shown in FIG. 7, the FFT power spectrum of the ionic current becomes as shown in FIG. 8, the natural vibration frequency of a knock is in the vicinity of "6 kHz".

Here, assuming, according to empirical rules, that the reference value (threshold THp) of the FFT power spectrum of a frequency of 6 kHz or therearound is 5 [a.u.], the power spectrum of FIG. 8 is by far greater than the threshold THp (=5 [a.u.]), so the knock signal detection section 4 outputs a signal indicating the occurrence of a great knock as a determination result in step S44. For example, in case of representing the strength of a knock by the number of digital pulses, the knock signal detection section 4 outputs "5 pulses" meaning the occurrence of a great knock as a knock signal Ki.

In addition, in case where an ionic current i with a noise component superposed thereon is input, as shown in FIG. 9, the FFT power spectrum of the ionic current i becomes as shown in FIG. 10, and exceeds the same threshold THp (=5 [a.u.]) to a great extent.

Accordingly, in case where the noise component detection section 6 is not considered, the knock signal detection section 4 will output a knock signal in the form of "5 pulses" meaning the occurrence of a great knock with respect to the ionic current waveform of FIG. 9.

Next, reference will be made to the operation of the window setting section 5 while referring to FIG. 4.

Figure 4:
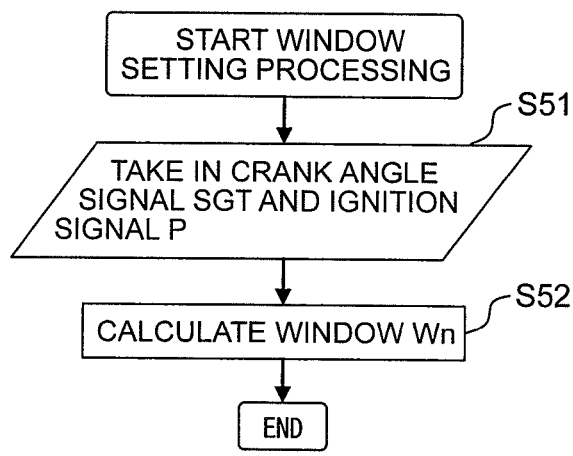
FIG. 4 is a flow chart illustrating window setting processing according to the first embodiment of the present invention.

In FIG. 4, first of all, the window setting section 5 takes in a crank angle signal SGT and an ignition signal P (step S51).

Subsequently, the window setting section 5 calculates a noise detection window Wn based on the crank angle signal SGT and the ignition signal P after a predetermined crank angle corresponding to the end of the combustion stroke of the internal combustion engine (step S52), and terminates the processing of FIG. 4.

The noise detection window Wn set by the window setting section 5 is input to the noise component detection section 6, where it contributes to the setting of a detection range TWn in the noise component detection section 6.

Here, note that a crank angle period or range (angle reference range) from a crank angle of 90 CA to the ignition timing of the following cylinder is set as a reference value for the detection range TWn.

Next, the operation of the noise component detection section 6 will be described while referring to FIG. 5.

Figure 5:
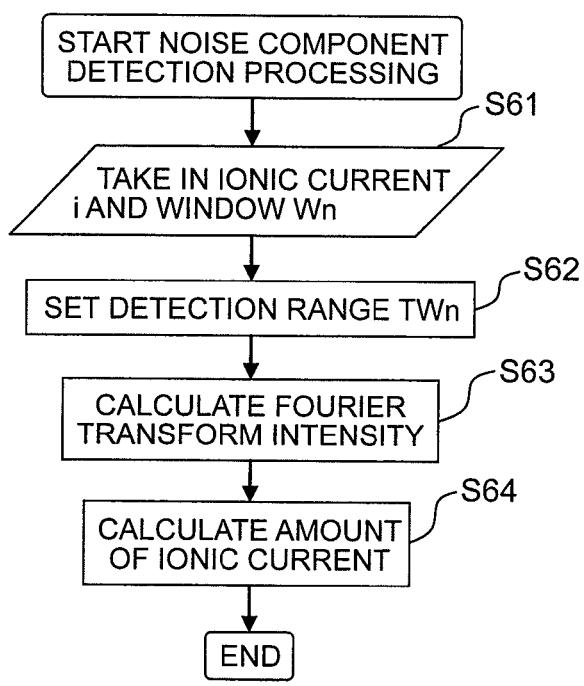
FIG. 5 is a flow chart illustrating noise component detection processing according to the first embodiment of the present invention.

In FIG. 5, first of all, the noise component detection section 6 takes in an ionic current i (digital data after A/D conversion) and the noise detection window Wn (set data) (step S61).

Subsequently, the noise component detection section 6 sets, based on the ionic current i and the noise detection window Wn thus input, a necessary detection range TWn within the detection range set based on the window Wn after the predetermined crank angle (the crank angle period from the crank angle of 90 CA to the following cylinder ignition timing) (step S62).

As a result, only data of the ionic current i in the detection range TWn is extracted, and further multiplied by a window function for suppressing the influence of ends of the detected data.

Then, the noise component detection section 6 converts the detected data of the ionic current i, to which preprocessing (detection range TWn, window function, etc.) was applied, into an FFT power spectrum by Fourier transform (step S63).

The value of the FFT power spectrum (noise component Ni) according to the noise component detection section 6 is output from the noise component detection section 6 as the noise component threshold value N1. For example, when the ionic current waveform (knock superposed) of FIG. 7 is input, no vibration component exists after the crank angle of 90 CA, so the FFT power spectrum becomes as shown in FIG. 11. Accordingly, the noise component detection section 6 outputs an FFT power spectrum of a value close to "0" as the noise component threshold value N1 with respect to the ionic current waveform of FIG. 7.

On the other hand, when the ionic current waveform of FIG. 9 (noise superposed) is input, a vibration component exists after the crank angle of 90 CA, so the FFT power spectrum becomes as shown in FIG. 12. Accordingly, the noise component detection section 6 outputs an FFT power spectrum in the vicinity of a frequency of 6 kHz as the noise component threshold value N1 with respect to the ionic current waveform of FIG. 9.

In addition, the noise component detection section 6 calculates an amount of ionic current generated (noise component threshold value N2) from the input ionic current i (step S64), and terminates the processing of FIG. 5.

Specifically, in step S64, the noise component detection section 6 extracts only the detected data of the ionic current i in the necessary detection range TWn within the detection range set after the predetermined crank angle (the crank angle period from the crank angle of 90 CA to the following cylinder ignition timing), and performs filtering preprocessing on the noise component, after which an average value thereof is output as the noise component threshold value N2.

For example, when the ionic current waveform (knock superposed) of FIG. 7 is input, the noise component detection section 6 outputs a value close to "0" as the noise component threshold value N2, whereas when the ionic current waveform (noise superposed) of FIG. 9 is input, a value of a certain level is output as the noise component threshold value N2.

The knock signal Ki (knock determination value) from the knock signal detection section 4 and the noise component Ni (noise component determination values N1, N2) from the noise component detection section 6 are input to the knock determination section 7. Finally, the knock determination section 7 diagnoses the reliability of the knock determination value Ki based on the knock determination value Ki and the noise component determination values N1, N2, and outputs a final knock determination result.

Next, the operation of the knock determination section 7 will be described while referring to FIG. 6.

Figure 6:
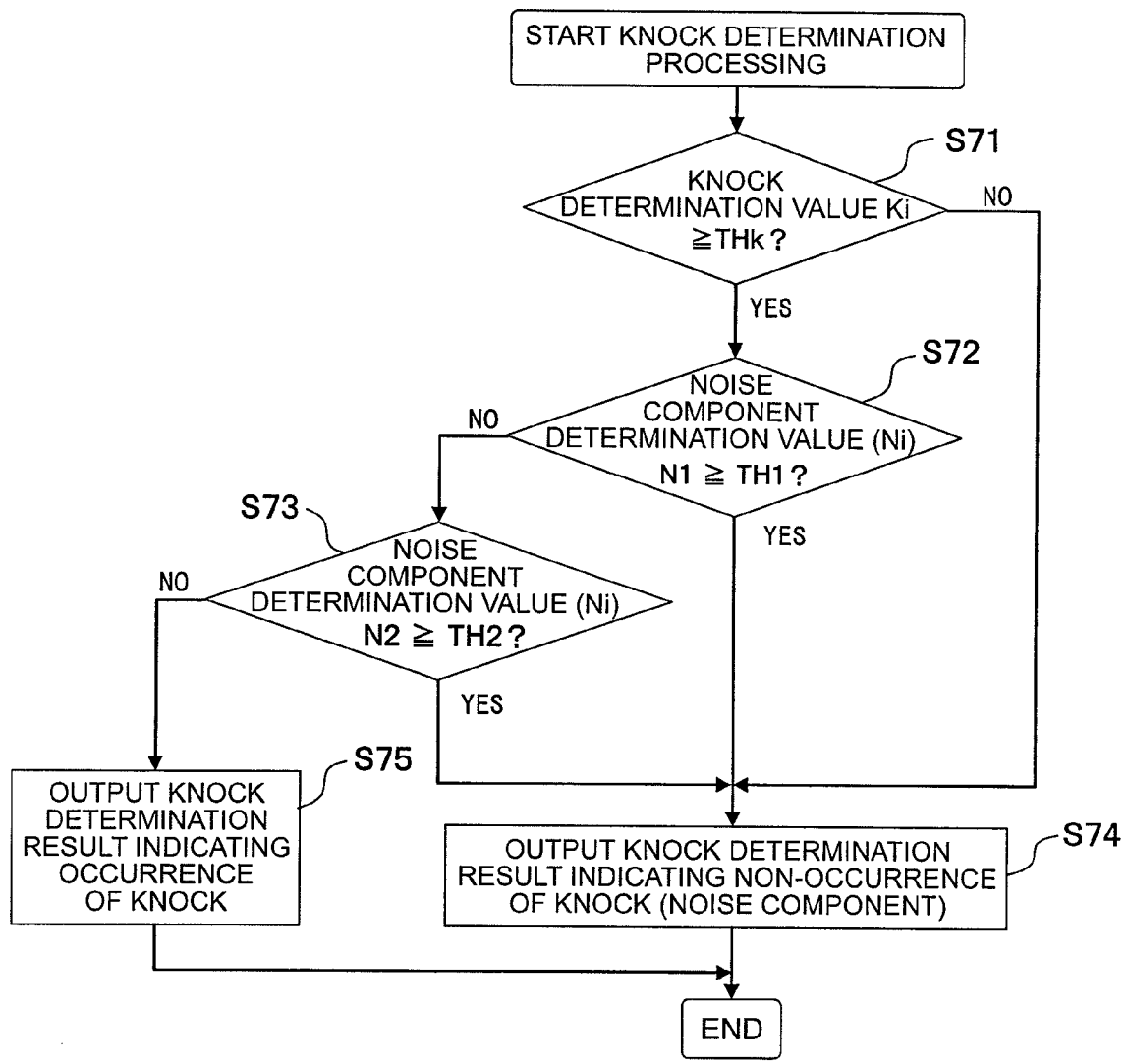
FIG. 6 is a flow chart illustrating knock determination processing according to the first embodiment of the present invention.

In FIG. 6, first of all, the knock determination section 7 takes in the knock signal Ki (knock determination value) from the knock signal detection section 4, and determines whether the knock determination value Ki is larger than or equal to a predetermined threshold THk (a value indicating the occurrence of a knock) (step S71).

When it is determined as Ki<THk in step S71 (that is, NO), the knock signal detection section 4 outputs a knock signal Ki indicating the non-occurrence of a knock, so the knock determination section 7 outputs a knock determination result indicating a noise component (non-occurrence of a knock) regardless of the value of the noise component Ni (step S74), and terminates the processing of FIG. 6.

When it is determined as Ki≧THk in step S71 (that is, YES), the knock signal detection section 4 outputs a knock signal Ki indicating the occurrence of a knock, so subsequently, the knock determination section 7 compares the noise component threshold value N1 (the frequency component intensity of the ionic current i) with a predetermined threshold TH1, and determines whether the noise component threshold value N1 is larger than or equal to the threshold TH1 (step S72).

When it is determined as N1≧TH1 in step S72 (that is, YES), the noise component detection section 6 outputs a noise component threshold value N1 of a high level, so it is assumed that the reliability of the knock signal Ki is low, and the control flow proceeds to the above-mentioned step S74, where the knock determination section 7 outputs a knock determination result indicating the non-occurrence of a knock.

On the other hand, when it is determined as N1<TH1 in step S72 (that is, NO), the noise component threshold value N1 is a low level, so subsequently, the knock determination section 7 compares the noise component threshold value N2 (the amount of ionic current generated) with a predetermined threshold TH2, and determines whether the noise component threshold value N2 is larger than or equal to the threshold TH2 (step S73).

When it is determined as N2≧TH2 in step S73 (that is, YES), it is assumed that the noise component determination value N2 is a high level and the reliability of the knock signal Ki is low, so the control flow proceeds to the above-mentioned step S74, where the knock determination section 7 outputs a knock determination result indicating the non-occurrence of a knock.

On the other hand, when it is determined as N2<TH2 in step S73 (that is, NO), the noise component threshold value N2 is a low level, so the knock determination section 7 outputs a knock determination result indicating the occurrence of a knock, and terminates the processing of FIG. 6.

For example, when taking an example of the ionic current waveform (knock superposed) of FIG. 7, the knock signal Ki is made as "5 pulses", and the noise component threshold value N1 (noise component Ni) is made as "0.1" (see FIG. 11).

At this time, when the threshold TH1 in step S72 is set to "1" based on empirical rules, the noise component threshold value N1 (=0.1) is less than the threshold TH1 (=1), so the knock signal Ki (=5 pulses) is output, as it is, as a knock determination result of the knock determination section 7.

On the other hand, in case of the ionic current waveform (noise superposed) of FIG. 9, when the knock signal Ki is similarly made as "5 pulses", the noise component threshold value N1 (≈5) (see FIG. 12) is compared with the threshold TH1 in step S72. In this case, the noise component threshold value N1 (≈5)≧the threshold TH1 (=1), and it is determined that the reliability of the knock signal Ki (=5 pulses) is low, so the knock determination section 6 outputs a knock determination result of "0 pulse" indicating that no knock has occurred.

What is described above is similar in the noise determination processing in step S73, and the knock determination section 7 can output a knock determination result that excludes the influence of the noise component Ni. As a result, it is possible to distinguish the knock waveform (FIG. 7) and the noise superposition waveform (FIG. 9) due to combustion disturbances from each other.

Although in FIG. 6, the noise component detection section 6 outputs, as the noise component Ni, both of the noise component determination values N1, N2 corresponding to the frequency component intensity of the ionic current i and the amount of ionic current generated, it may output only either one of the noise component determination values N1, N2. In this case, too, the knock determination section 7 can eliminate the influence of the noise component based on only one of the noise component determination values N1, N2, and hence it can output a highly reliable knock determination result.

As described above, the knock detection apparatus for an internal combustion engine according to the first embodiment of the present invention includes the ionic current detection device 1 that detects an ionic current i based on ions generated upon combustion in the internal combustion engine, the knock signal detection section 4 that detects a knock signal Ki based on the ionic current i, the crank angle sensor 8 that detects a crank angle corresponding to the rotational position of the internal combustion engine, the window setting section 5 that sets a noise detection window Wn after a predetermined crank angle corresponding to an end of a combustion stroke of the internal combustion engine, the noise component detection section 6 that detects a noise component Ni based on at least one of the frequency component intensity of the ionic current i and the amount of ionic current generated in the window Wn, and the knock determination section 7 that determines the presence or absence of the occurrence of a knock based on the relation between the noise component Ni and the knock signal Ki.

The noise component detection section 6 includes a detection range setting section that sets a predetermined detection range TWn based on the window Wn, and outputs the frequency component intensity of the ionic current within the detection range TWn as the noise component Ni (noise component threshold value N1).

In addition, the noise component detection section 6 outputs the amount of ionic current generated within the detection range TWn as the noise component N1 (noise component threshold value N2).

The knock determination section 7 includes the threshold setting section 71 that sets thresholds TH1, TH2 for the noise component Ni (noise component determination values N1, N2), the comparison section (steps S72, S73) that compares the noise component Ni with the thresholds TH1, TH2, and the correction section (steps S74, S75) that corrects the knock signal Ki in accordance with a comparison results of the comparison section and outputs it as a final knock determination result.

With the above, it is possible to suppress an incorrect determination of the occurrence of a knock in the knock determination section 7, so the detection accuracy of the knock detection apparatus can be improved. That is, at the end of a combustion stroke upon the occurrence of a knock, an ionic current i is not substantially generated, and a noise component Ni is not generated either, based on which even if a noise component of the same frequency as a knock vibration superposes on the ionic current i, it is possible to obtain a final knock determination result by distinguishing the noise component Ni and the knock signal Ki from each other with high precision, whereby the presence or absence of the occurrence of a knock can be detected at a high degree of precision and at a high degree of efficiency.

Moreover, a change in the detection state of the ionic current i such as an individual difference of the internal combustion engine, a time-related change thereof, etc., can be dealt with, thus making it possible to improve reliability. Further, the influence of incorrect knock determination on the ignition device 10 can be reduced, thereby making it possible to suppress the deterioration of an exhaust gas.

Although in the above-mentioned first embodiment, the detection range TWn in the noise component detection section 5 is set to the angle reference range from a crank angle of 90 CA to the ignition timing of the following cylinder, it is not limited to this, but may be set to a reference time, a reference number of data pieces, or the like while achieving similar operational effects.

In addition, the start position and the end position of the detection range TWn set in the noise component detection section 6 (detection range setting section) may be set based on map values that are arbitrarily set beforehand in accordance with the operating state of the internal combustion engine detected by the various kinds of sensors 15.

Embodiment 2

Although in the above-mentioned first embodiment, the thresholds TH1, TH2 for the noise component determination values N1, N2 are set to the predetermined values in the processing of the knock determination section 7 (steps S72, S73), they may be set based on map values that are set beforehand in accordance with the operating state of the internal combustion engine (e.g., the number of engine revolutions per minute, the engine load, etc.). With this, it is possible to further improve the reliability and detection accuracy of a knock detection apparatus using an ionic current i which is liable to be influenced by the engine operating state.

Embodiment 3

Also, in the above-mentioned first embodiment, when it is determined in the processing of the knock determination section 7 (steps S72, S73) that the reliability of the knock signal Ki is low, a knock determination result indicating the non-occurrence of a knock is output regardless of the value of the knock signal Ki (step S74), but the value of the knock signal Ki may be subtracted by a predetermined amount (or subtracted by a predetermined ratio).

In this case, the correction section (step S74) sets a correction value (predetermined amount) in accordance with the comparison results of the comparison section (steps S72, S73), adds or subtracts the correction value to or from the knock signal Ki, and outputs the knock signal Ki thus corrected as a final knock determination result.

For example, when a knock signal Ki of "5 pulses" indicating a great knock is input, and when it is determined in step S72, S73 that the reliability of the knock signal Ki is low, the knock determination section 7 subtracts the knock signal Ki by "3 pulses" to "2 pulses" so as not to decrease a final knock determination result to below "0 pulse", changes the final knock determination result to a knock determination result indicating the possibility of the occurrence of a small knock, and outputs it. As a result, it is possible to reduce the possibility of an incorrect determination of the noise component detection section 6, and to suppress retard control of the ignition timing due to such an incorrect knock determination resulting from the noise component Ni.

Embodiment 4

Although in the above-mentioned first and third embodiments, it is determined in the processing of the knock determination section 7 (steps S72, S73) whether the reliability of the knock signal Ki is low or not (alternatively), an amount of correction for the knock signal Ki may be adjusted in accordance with differences thereof from the thresholds TH1, TH2 (or ratios thereof to the thresholds TH1, TH2, or function values of the thresholds TH1, TH2).

In this case, the comparison section (steps S72, S73) outputs differences (or ratios) between the noise component determination values N1, N2 and the thresholds TH1, TH2 as comparison results. For example, if a difference (=N1−TH1) between the noise component determination value N1 (the FFT power spectrum in the detection range TWn) and the threshold TH1 (=1) is "less than 2" with respect to the knock signal Ki (=5 pulses), a subtraction correction by "−2 pulses" can be performed. If the difference is within a "range of 2-3", a subtraction correction by "−4 pulses" can be performed, and if the difference is "greater than or equal to 3", a subtraction correction by "−5 pulses" can be performed.

Alternatively, with respect to the knock signal Ki (=5 pulses), taking account of the ratio of the noise component determination value N1 and the threshold TH1 in place of the difference therebetween, if the noise component determination value N1 is less than twice the threshold TH1, a subtraction correction by "−3 pulses" can be performed, and if the ratio is "greater than or equal to 3 fold", a subtraction correction by "−5 pulses" can be performed. Similar correction processing can be applied to the threshold TH2.

Here, note that the correction section is not limited to the addition and subtraction correction for the knock signal Ki, but may multiply or divide the knock signal Ki by a correction value set in accordance with the comparison results of steps S72, S73. With this, an adjustable range of the final knock determination result is extended, so the possibility of an incorrect determination of the noise component detection device can be suppressed in a more efficient manner, and the retard control of the ignition timing due to an incorrect knock determination resulting from a noise component Ni can be suppressed.

In addition, by making these differences and ratios (or functions) to map values corresponding to the engine operating state, it is possible to avoid incorrect knock determinations in a further efficient manner.

Embodiment 5

Figure 13:
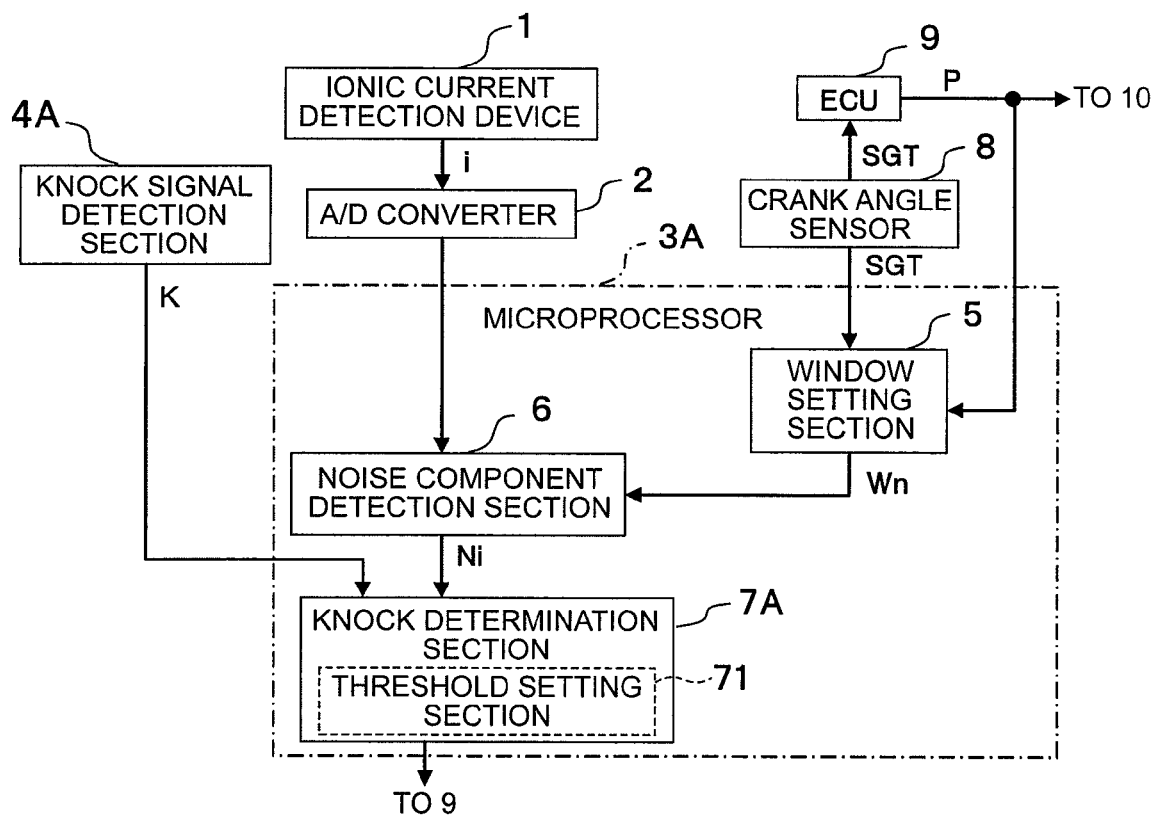
FIG. 13 is a functional block diagram showing an example of a specific configuration of a microprocessor according to a fifth embodiment of the present invention.

Although in the above-mentioned first embodiment, the knock signal detection section 4 based on the ionic current i is used, there may be used a knock signal detection section 4A that does not depend on the ionic current i, as shown in FIG. 13.

FIG. 13 is a functional block diagram that shows an example of a specific configuration of a microprocessor according to a fifth embodiment of the present invention, wherein the same or like parts or elements as those described above (see FIG. 2) are identified by the same symbols while omitting a detailed description thereof.

In this case, the knock signal detection section 4A detects a knock signal K corresponding to a knock vibration of an internal combustion engine, and inputs it to a knock determination section 7A in a microprocessor 3A.

As the knock signal detection section 4A, there can be used, for example, a knock sensor of a non-resonance type, a knock sensor of a combined type comprising a pressure sensor for detecting the pressure in a cylinder and a band-pass filter in combination with the pressure sensor, etc.

In this case, too, the reliability of the knock signal K can be determined by using a window setting section 5 based on a crank angle signal SGT and an ignition signal P and a noise component detection section 6 based on the detected data of an ionic current i, so the knock detection accuracy in the knock determination section 7 can be improved.

Here, note that the knock detection apparatuses of the internal combustion engine according to the above-mentioned first through fifth embodiments are applicable to arbitrary internal combustion engines installed on motor vehicles, motorcycles, outboard engines or other special machines, and it is of course needless to say that they can be made use for environmental protection through improvements in operation efficiency, reduction in emissions, etc., of the internal combustion engines thus installed.

While the invention has been described in terms of preferred embodiments, those skilled in the art will recognize that the invention can be practiced with modifications within the spirit and scope of the appended claims.

What is claimed is:

1. A knock detection apparatus for an internal combustion engine comprising:
- an ionic current detection device that detects an ionic current based on ions generated upon combustion in said internal combustion engine;
- a knock signal detection section that detects a knock signal based on said ionic current;
- a crank angle detection section that detects a crank angle corresponding to a rotational position of said internal combustion engine;
- a window setting section that sets a noise detection window after a predetermined crank angle corresponding to an end of a combustion stroke of said internal combustion engine;
- a noise component detection section that detects a noise component based on at least one of a frequency component intensity of said ionic current and an amount of ionic current generated in said window; and
- a knock determination section that determines the presence or absence of the occurrence of a knock based on a relation between said noise component and said knock signal.

2. The knock control apparatus for an internal combustion engine as set forth in claim 1,
wherein said noise component detection section includes a detection range setting section that sets a predetermined detection range based on said window, and outputs said amount of ionic current generated in said predetermined detection range as said noise component.

3. The knock control apparatus for an internal combustion engine as set forth in claim 2,
wherein said detection range setting section sets said detection range based on map values set beforehand in accordance with an operating state of said internal combustion engine.

4. The knock control apparatus for an internal combustion engine as set forth in claim 1,
wherein said noise component detection section includes a detection range setting section that sets a predetermined detection range based on said window, and outputs a frequency component intensity of said ionic current within said detection range as said noise component.

5. The knock control apparatus for an internal combustion engine as set forth in claim 1,
wherein said knock determination section includes:
- a threshold setting section that sets thresholds for said noise component;
- a comparison section that compares said noise component with said thresholds; and
- a correction section that corrects said knock signal in accordance with comparison results of said comparison section.

6. The knock control apparatus for an internal combustion engine as set forth in claim 5,
wherein said threshold setting section sets said thresholds based on map values set beforehand in accordance with an operating state of said internal combustion engine.

7. The knock control apparatus for an internal combustion engine as set forth in claim 5,
wherein said comparison section outputs differences between said noise component and said thresholds.

8. The knock control apparatus for an internal combustion engine as set forth in claim 5,
wherein said comparison section outputs ratios between said noise component and said thresholds as said comparison results.

9. The knock control apparatus for an internal combustion engine as set forth in claim 5,
wherein said correction section sets a correction value in accordance with said comparison results, and adds or subtracts said correction value to or from said knock signal.

10. The knock control apparatus for an internal combustion engine as set forth in claim 5,
wherein said correction section sets a correction value in accordance with said comparison results, and multiplies or divides said knock signal by said correction value.

11. A knock detection apparatus for an internal combustion engine comprising:
- an ionic current detection device that detects an ionic current based on ions generated upon combustion in said internal combustion engine;
- a knock signal detection section that detects a knock signal corresponding to a knock vibration of said internal combustion engine;
- a crank angle detection section that detects a crank angle corresponding to a rotational position of said internal combustion engine;
- a window setting section that sets a noise detection window after a predetermined crank angle corresponding to an end of a combustion stroke of said internal combustion engine;
- a noise component detection section that detects a noise component based on at least one of a frequency component intensity of said ionic current and an amount of ionic current generated in said window; and
- a knock determination section that determines the presence or absence of the occurrence of a knock based on a relation between said noise component and said knock signal.

* * * * *